United States Patent [19]

Lu

[11] Patent Number: 5,503,491
[45] Date of Patent: Apr. 2, 1996

[54] POSITIONING PIVOT

[76] Inventor: Sheng N. Lu, No. 174, Chun Ying St., Shu Lin Chen, Taipei Hsien, Taiwan

[21] Appl. No.: 319,280

[22] Filed: Oct. 6, 1994

[51] Int. Cl.[6] .................................................. E05D 11/08
[52] U.S. Cl. ............................ 403/86; 16/339; 16/342; 248/292.13; 248/921; 403/103
[58] Field of Search .......................... 16/339, 340, 342; 248/185.1, 292.13, 919, 920, 921, 922, 923; 361/680, 681; 403/83, 84, 86, 91, 103, 145, 150

[56] References Cited

U.S. PATENT DOCUMENTS

| | | | |
|---|---|---|---|
| 4,639,147 | 1/1987 | Schwarz | 16/342 X |
| 4,712,870 | 12/1987 | Robinson et al. | 403/84 X |
| 4,982,453 | 1/1991 | Matsumoto | 16/342 X |
| 5,088,156 | 2/1992 | Hosoi | 16/342 |
| 5,142,738 | 9/1992 | Ojima | 16/342 X |
| 5,211,368 | 5/1993 | Kitamura | 248/923 X |
| 5,231,734 | 8/1993 | Rude | 16/342 |
| 5,333,356 | 8/1994 | Katagiri | 16/342 X |
| 5,340,073 | 8/1994 | Masakazu | 403/103 X |

Primary Examiner—Kenneth J. Dorner
Assistant Examiner—Andrea Chop
Attorney, Agent, or Firm—William E. Pelton

[57] ABSTRACT

A friction adjustable positioning pivot includes a first shaft including a tapering threaded rod which defines a hollow space therein and a slot along a periphery thereof. An urging tube is taperingly threaded therein for rotatably threading onto the tapering threaded rod of the first shaft. A spring received in the hollow space of the first shaft includes an outer periphery substantially in contact with an inner periphery of the hollow space of first shaft and an inner periphery. A second shaft includes a rod portion received in the spring and in contact with the inner periphery of the spring. The first shaft and the second shaft are rotatably retained in a relative angle due to a friction resulted from the spring against the inner periphery of the tapering rod of the first shaft and the rod portion of the second shaft, whereby the urging tube is allowed to be manually threaded onto the tapering rod of the first shaft thus tightening the tapering rod of the first shaft, which in turn tightens the spring from radial direction thereby increasing friction of the spring against the inner periphery of the tapering rod of the first shaft and the rod portion of the second shaft.

3 Claims, 5 Drawing Sheets

POSITIONING PIVOT

BACKGROUND OF THE INVENTION

1. Field of the Invention

The present invention relates to a positioning pivot which maintains a rotational position after being manually rotated, and more particularly to a friction adjustable positioning pivot whose friction is manually adjustable before it is used for different loads.

2. Description of the Prior Art

Positioning pivots are commonly used in many casing structures such as a notebook computer. FIG. 5 illustrates a conventional positioning pivot in cross-sectional view used in any pivotable casing structure. The conventional positioning pivot comprises a first shaft 90 connected to a cylinder 91, a resistance tube 92 made of engineering plastic being received in the cylinder 91, and a second shaft 93 being received in the resistance tube 92. The first shaft 90 and the second shaft 93 are in alignment with each other and are allowed to be rotated with respect to each other. The resistance tube 92 has an outer periphery in contact with an inner periphery of the cylinder 91 and an inner periphery thereof in contact with the second shaft 93. Therefore, the second shaft 93 is pivotable with respect to the resistance tube 92 and the resistance tube 92 is pivotable with respect to the cylinder 91. Since the cylinder 91 is firmly connected to the first shaft 90, the resistance tube 92 is also pivotable with respect to the first shaft 90. Normally the first shaft 90 is attached to a cover such as the screen panel of a notebook computer and the second shaft 93 is attached to a base such as a main body of the notebook computer or vice versa. The first shaft 90 can be rotated to a required angle with respect to the second shaft 93 and the rotated angle can be retained due to a resistance resulted from the resistance tube 92. It should be noted that the outer periphery and the inner periphery of the resistance tube 92 each respectively contributes friction against the cylinder 91 and the second shaft 93. Therefore, in practical use, the cover connected to the first shaft 90 can be pivoted to a required angle with respect to the main body connected to the second shaft 93. However, the conventional pivot can only provide a constant resistance regardless of different loads, therefore it is not suitable for different loads. For example, the resistance tube 92 may retain one kind of cover in a required pivoted angle with respect to the main body, yet it can not retain another cover which is relatively heavier than the previous cover.

The present invention has arisen to mitigate and/or obviate the afore-described disadvantages of the conventional pivot.

SUMMARY OF THE INVENTION

The primary objective of the present invention is to provide a resistance adjustable positioning pivot whose resistance is manually adjustable for different kinds of loads.

In accordance with one aspect of the invention, there is provided a friction adjustable positioning pivot including a first shaft including a tapering threaded rod which defines a hollow space therein and a slot along a periphery thereof. An urging tube includes an inner threaded periphery and an inner tapering periphery for rotatably threading onto the tapering threaded rod of the first shaft. A spring received in the hollow space of the first shaft includes an outer periphery substantially in contact with an inner periphery of the hollow space of first shaft and an inner periphery. A second shaft includes a rod portion received in the spring and in contact with the inner periphery of the spring. The first shaft and the second shaft are rotatably retained at a relative angle due to a friction resulted from the spring against the inner periphery of the tapering rod of the first shaft and the rod portion of the second shaft, whereby the urging tube is allowed to be manually threaded onto the tapering rod of the first shaft thus tightening the tapering rod of the first shaft, which in turn tightens the spring from radial direction thereby increasing friction of the spring against the inner periphery of the tapering rod of the first shaft and the rod portion of the second shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
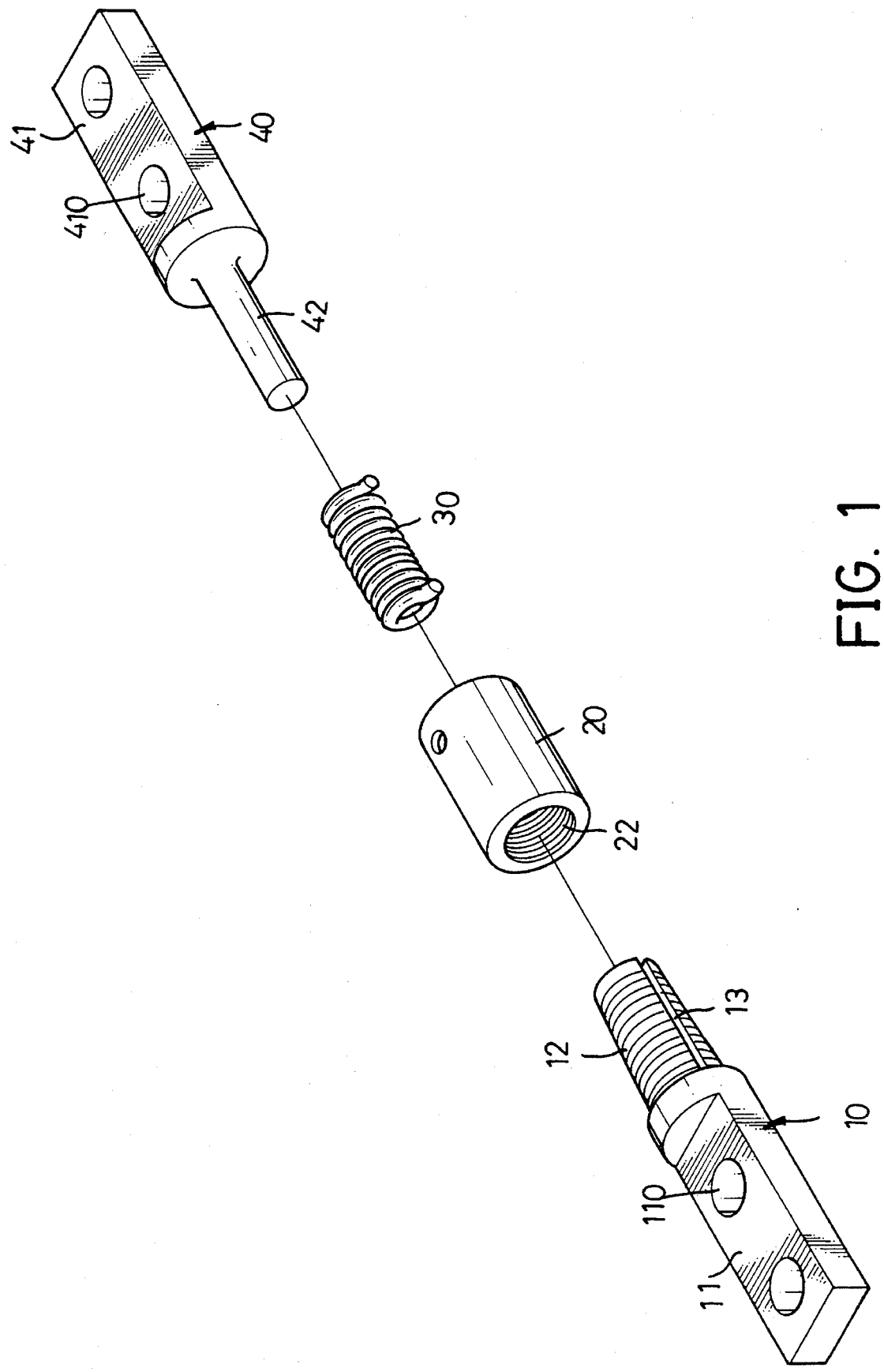
FIG. 1 is an exploded view of a resistance adjustable pivot in accordance with the present invention.

Referring to FIG. 1, a first embodiment of a friction adjustable positioning pivot in accordance with the present invention comprises a first shaft 10, an urging tube 20, an elastic means 30, and a second shaft 40. The first shaft 10 has a flat portion 11 connected to a tapering rod portion 12. Two holes 110 are defined in the flat portion 11 and the tapering rod portion 12 is threaded around an outer periphery thereof. The tapering rod portion 12 is centrally hollow and defines a longitudinal slot 13 along a periphery thereof. The urging tube 20 has an inner threaded periphery 22 and an inner tapering periphery 21 (see FIG. 2) for receiving the tapering rod portion 12 of the first shaft 10. The first shaft 10 is connected to a first half of a casing such as a screen panel of a notebook computer by fastening bolts (not shown) into the holes 110. The second shaft 40 has a flat portion 41 connected to a rod portion 42. Two holes 410 are defined in the flat portion 41 of the second shaft 40. The elastic means 30 can be a spring and is positioned around the rod portion 42 of the second shaft 40. The rod portion 42 of the second shaft 40 together with the spring 30 are received in the longitudinal hollow portion of the tapering rod portion 12 of the first shaft 10.

Figure 2:
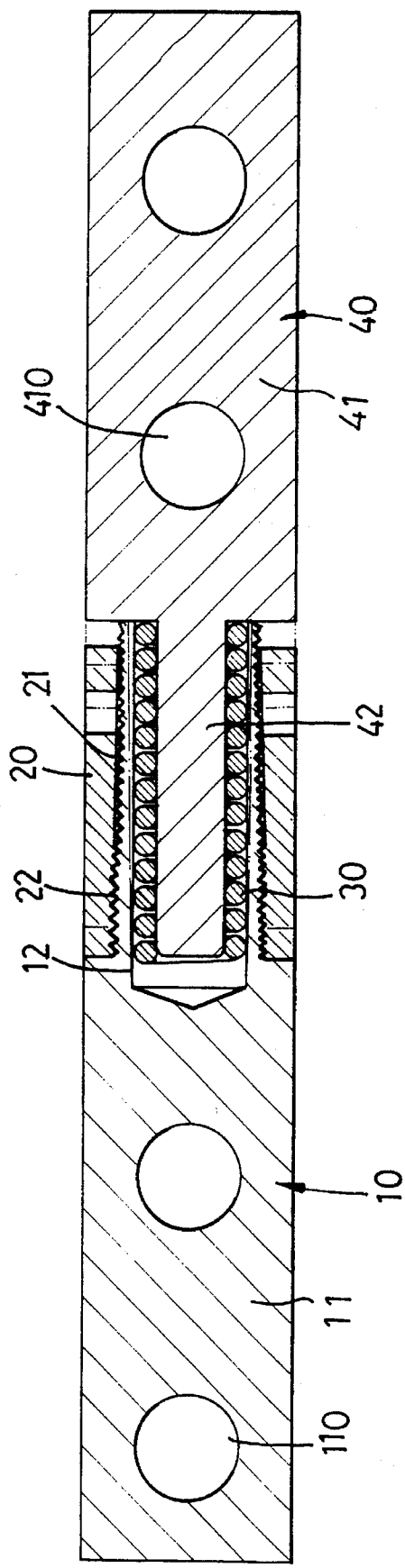
FIG. 2 is an assembled view of FIG. 1 shown in a cross-sectional view, where an urging tube is shown with solid lines and phantom lines for illustrating the urging tube is adjustable with respect to a tapering rod portion of a first shaft.
Figure 3:
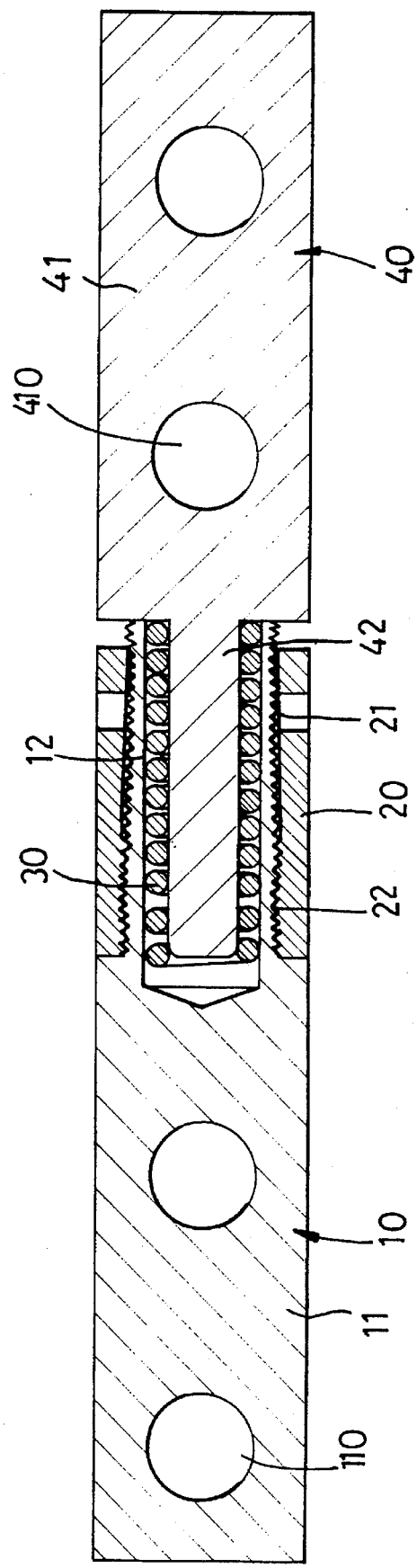
FIG. 3 illustrates the pivot of FIG. 2 adjusted to have maximum friction.

Referring to FIG. 2, the rod portion 42 of the second shaft 40 is enclosed by the spring 30 and they together are received in the longitudinal hollow space of the tapering rod portion 12 of the first shaft 10 which is threaded into the urging tube 20. The spring 30, the inner periphery of the tapering rod portion 12 of the first shaft 10, and the periphery of the rod portion 42 of the second shaft 40 are so sized that an outer periphery of the spring 30 is in contact with the inner periphery of the tapering rod portion 12 and an inner periphery of the spring 30 is in contact with the periphery of the rod portion 42. The first shaft 10 is retained in a rotational position with respect to the second shaft 40 due to friction resulted from the spring 30 urging against the inner periphery of the tapering rod portion 12 of the first shaft 10 and the periphery of the rod portion 42 of the second shaft 40. The inner threaded periphery 22 and the inner tapering periphery 21 of the urging tube 20 and the tapering rod portion 12 are so sized that when the tapering rod portion 12 of the first shaft 10 is threaded into the urging tube 20 deeper, the slot 13 of the tapering rod portion 12 becomes thinner thereby tightening the spring 30 in the tapering rod portion 12 of the first shaft 10. Therefore, the friction of the positioning pivot is adjustably increased by threading the urging tube 20 deeper onto the tapering rod portion 12 of the first shaft 10. The phantom lines for the urging tube 20 illustrate that the urging tube 20 tightens the tapering rod portion 12 of the first shaft 10 in a relatively loose manner while the solid lines for the urging tube 20 illustrate that the urging tube 20 tightens the tapering rod portion 12 of the first shaft 10 in a tightest manner. For clarification, FIG. 3 illustrates the urging tube 20 tightening the tapering rod portion 12 of the first shaft 10 in a tightest manner thus the pivot is adjusted to have a maximum pivotal friction.

Figure 4:
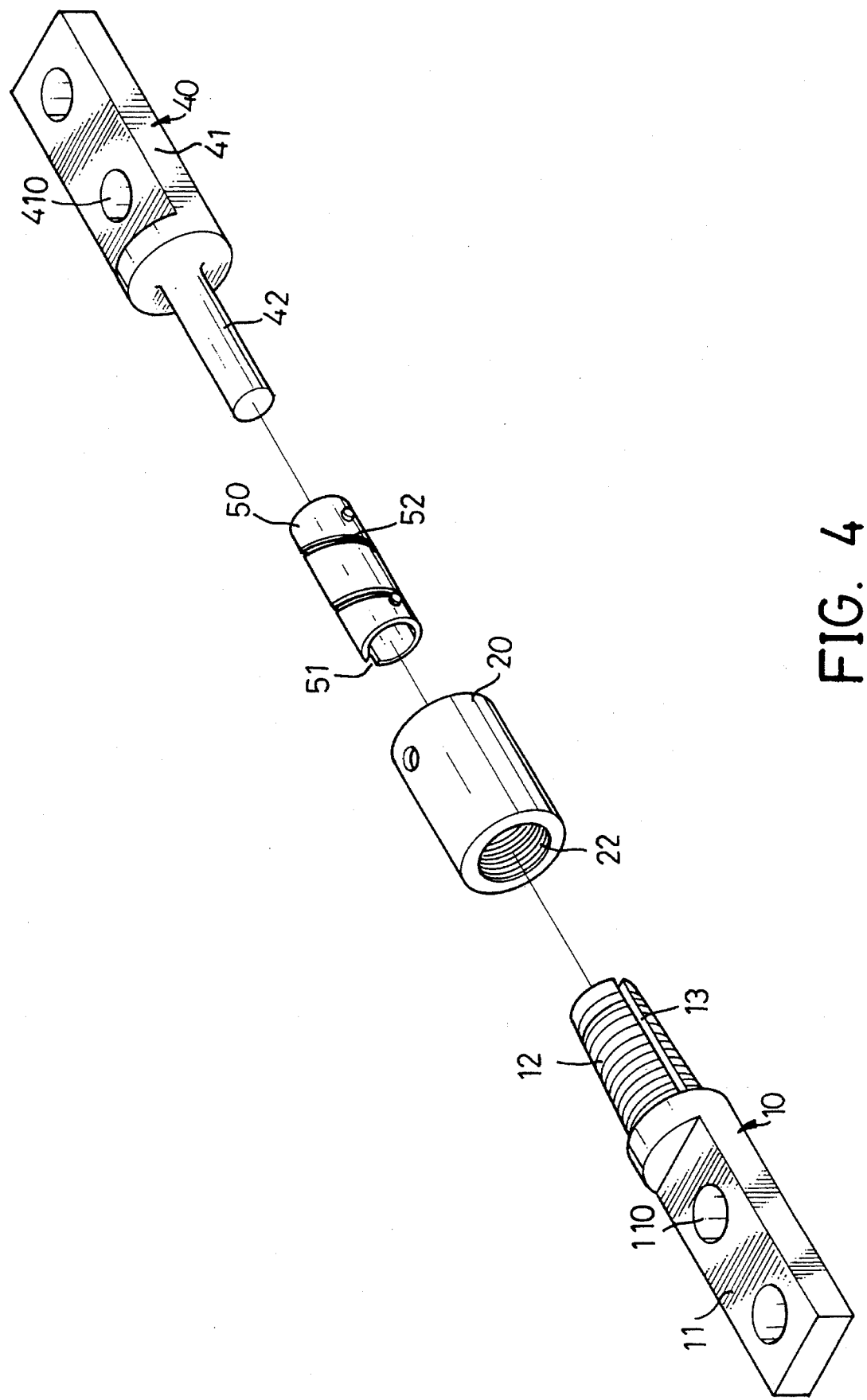
FIG. 4 is a second embodiment of the pivot shown in exploded view.
Figure 5:
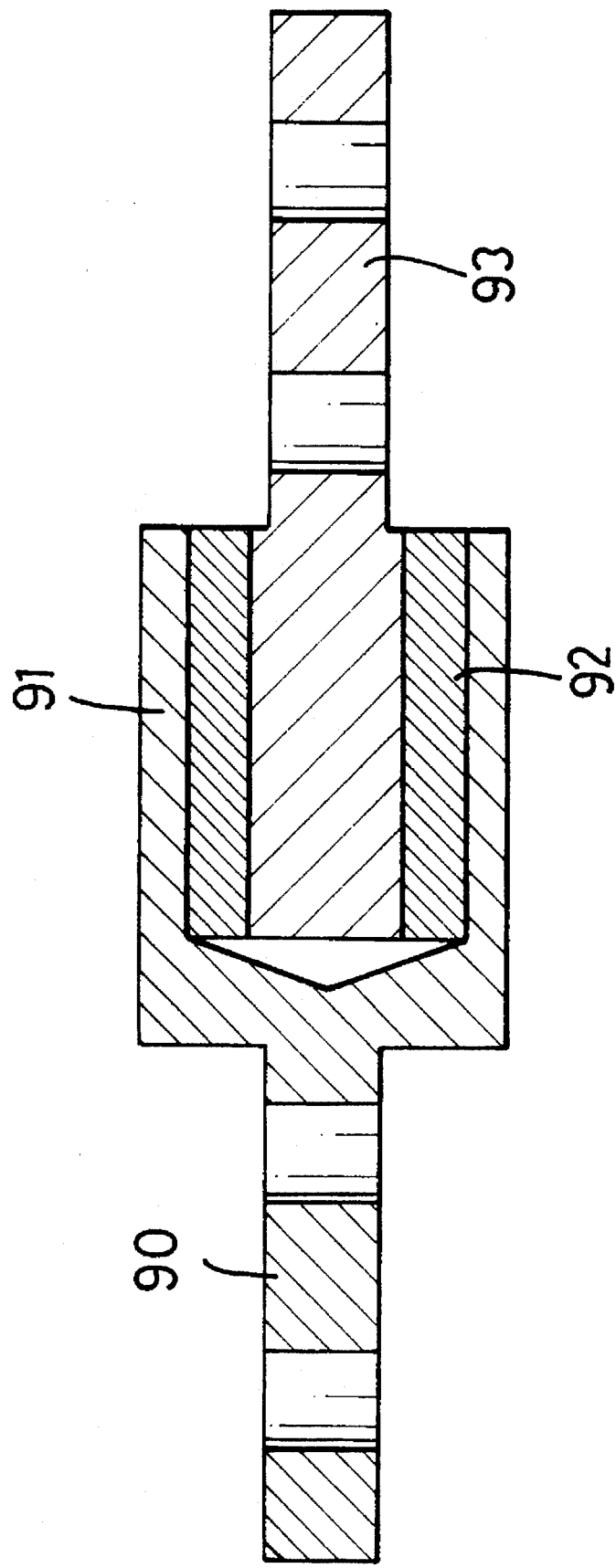
FIG. 5 is a conventional pivot shown in cross-sectional view.

Referring to FIGS. 1 and 4, the spring 30 of the first embodiment may be replaced with an inner tube 50 made of elastic material such as engineering plastic. The inner tube 50 has a longitudinal slot 51 through two distal ends thereof therefore, i.e., the inner tube 50 has a cross-sectional view as "C". A plurality of helical grooves 52 are defined on an outer periphery of the inner tube 50. The inner tube 50 is placed around the rod portion 42 of the second shaft 40 and both together are received in the hollow space of the tapering rod portion 12. Similar to the first embodiment, the first shaft 10 is retained in a rotational position with respect to the second shaft 40 due to friction resulted from the inner tube 50 against the inner periphery of the tapering rod portion 12 of the first shaft 10 and the periphery of the rod portion 42 of the second shaft 40. When the tapering rod portion 12 of the first shaft 10 is threaded into the urging tube 20 deeper, the slot 13 of the tapering rod portion 12 becomes thinner thereby tightening the inner tube 50 therein from radial direction, thereby increasing friction of the inner tube 50 against the inner periphery of the tapering rod 12 of the first shaft 10 and the rod portion 42 of the second shaft 40. It should be noted that the slot 51 of the inner tube 50 is narrowed when the inner tube 50 accepts tightening force from the tapering rod portion 12 of the first shaft 10, which in turn tightens the rod portion 42 of the second shaft 40. The grooves 52 are formed for deformation of the inner tube 50 (when the inner tube is tightened) preventing the latter from breaking. Therefore, the friction of the positioning pivot is adjustably increased by threading the resistance means 20 deeper onto the tapering rod portion 12 of the first shaft 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

What is claimed is:

1. A friction adjustable positioning pivot comprising:

a first shaft including a tapering threaded rod which defines a hollow space therein and a slot along a periphery thereof;

an urging tube including an inner threaded tapering periphery for rotatably threading onto the tapering threaded rod of the first shaft;

a spring received in the hollow space of the first shaft including an outer periphery substantially in contact with an inner periphery of the hollow space of the first shaft and an inner periphery;

a second shaft having a rod portion received in the spring and in contact with the inner periphery of the spring;

whereby the first shaft and the second shaft are rotatably retained at an angle due to friction resulting from the spring against the inner periphery of the tapering threaded rod of the first shaft and the rod portion of the second shaft, whereby the urging tube is allowed to be manually threaded onto the tapering threaded rod of the first shaft thus tightening the tapering threaded rod of the first shaft, which in turn tightens the spring in a radial direction thereby increasing friction of the spring against the inner periphery of the tapering threaded rod of the first shaft and the rod portion of the second shaft.

2. A friction adjustable positioning pivot comprising:

a first shaft including a tapering threaded rod which defines a hollow space therein and a slot along a periphery thereof;

an urging tube including an inner threaded tapering periphery for rotatably threading onto the tapering threaded rod of the first shaft;

an inner tube made of elastic material defining a longitudinal slot through two distal ends thereof and received in the hollow space of the first shaft and including an outer periphery substantially in contact with an inner periphery of the hollow space of the first shaft and an inner periphery;

a second shaft having a rod portion received in the inner tube and in contact with the inner periphery of the inner tube;

whereby the first shaft and the second shaft are rotatably retained at an angle due to friction resulting from the inner tube against the inner periphery of the tapering threaded rod of the first shaft and the rod portion of the second shaft, whereby the urging tube is allowed to be manually threaded onto the tapering threaded rod of the first shaft thus tightening the tapering threaded rod of the first shaft, which in turn tightens the inner tube in a radial direction thereby increasing friction of the inner tube against the inner periphery of the tapering threaded rod of the first shaft and the rod portion of the second shaft.

3. A friction adjustable positioning pivot as claimed in claim 2, wherein the inner tube defines a plurality of grooves on the outer periphery thereof preventing the inner tube from breaking when the inner tube is tightened inside the tapering threaded rod of the first shaft.

\* \* \* \* \*